US010963294B2

(12) United States Patent
Fornash et al.

(10) Patent No.: US 10,963,294 B2
(45) Date of Patent: Mar. 30, 2021

(54) COGNITIVE CLOUD MIGRATION OPTIMIZER

(71) Applicant: International Business Machines Corporation, Armonk, NY (US)

(72) Inventors: Sean Fornash, Hudson, NH (US); Clea A. Zolotow, Key West, FL (US); James S. Bennett, Markham (CA); Laxmikantha Sai Nanduru, Hyderabad (IN); Arvind Viswanathan, British Columbia (CA); Anthony Hunt, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 122 days.

(21) Appl. No.: 16/025,430

(22) Filed: Jul. 2, 2018

(65) Prior Publication Data
US 2020/0004582 A1 Jan. 2, 2020

(51) Int. Cl.
*G06F 9/48* (2006.01)
*G06F 9/50* (2006.01)
(Continued)

(52) U.S. Cl.
CPC ........ *G06F 9/4856* (2013.01); *G06F 9/45558* (2013.01); *G06F 9/5077* (2013.01);
(Continued)

(58) Field of Classification Search
None
See application file for complete search history.

(56) References Cited

U.S. PATENT DOCUMENTS 8,832,032 B2 9/2014 O'Connor et al.
8,924,539 B2 12/2014 Ferris et al.
(Continued)

FOREIGN PATENT DOCUMENTS

EP 2648098 A2 9/2013
WO WO 2013185175 A1 12/2013
WO WO 2015126409 A1 8/2015

OTHER PUBLICATIONS

P. Mell, et al. "*The NIST Definition of Cloud Computing*", NIST Special Publication 800-145, Sep. 2011, Gaithersburg, MD.
(Continued)

*Primary Examiner* — Eric C Wai
(74) *Attorney, Agent, or Firm* — Brian Restauro, Esq.; Hye Jin Lucy Song, Esq.; Heslin Rothenberg Farley & Mesiti P.C.

(57) ABSTRACT

Methods, computer program products, and systems are presented. The methods include, for instance: input data from the source environment, including application hosting data of each server in the source environment and one or more cloud type of the source environment. Candidate cloud types for target platform are listed and servers of the source environment are screened for eligibility for the migration. The target platform is selected by applying preconfigured selection rules on the application hosting data of each eligible server in the source environment. Migration recommendations for each eligible server in the source environment, including selected cloud type corresponding to the target platform, are produced.

20 Claims, 9 Drawing Sheets

(51) Int. Cl.
  *H04L 29/08* (2006.01)
  *G06F 9/455* (2018.01)
(52) U.S. Cl.
  CPC ...... *H04L 67/1008* (2013.01); *H04L 67/1012*
  (2013.01); *G06F 2009/4557* (2013.01)

(56) References Cited

U.S. PATENT DOCUMENTS

| | | |
|---|---|---|
| 9,003,502 B2 | 4/2015 | Zhang et al. |
| 9,088,479 B2 | 7/2015 | Heninger et al. |
| 9,781,205 B2 | 10/2017 | Batrouni et al. |
| 2012/0204187 A1 | 8/2012 | Breiter et al. |
| 2012/0304179 A1 | 11/2012 | Devarakonda et al. |
| 2013/0067090 A1 | 3/2013 | Batrouni et al. |
| 2013/0332588 A1 | 12/2013 | Maytal et al. |
| 2014/0040888 A1 | 2/2014 | Bookman et al. |
| 2014/0122577 A1 | 5/2014 | Balasubramanian et al. |
| 2014/0173112 A1 | 6/2014 | Seago et al. |
| 2014/0189677 A1 | 7/2014 | Curzi et al. |
| 2014/0279201 A1 | 9/2014 | Iyoob et al. |
| 2014/0280918 A1 | 9/2014 | Grandhe et al. |
| 2014/0359129 A1 | 12/2014 | Sharma et al. |
| 2015/0074279 A1 | 3/2015 | Maes et al. |
| 2015/0263979 A1 | 9/2015 | Kasturi et al. |
| 2015/0356406 A1 | 12/2015 | Sanchez et al. |
| 2015/0381435 A1 | 12/2015 | Todd et al. |
| 2015/9356432 | 12/2015 | Sanchez et al. |
| 2016/0055023 A1 | 2/2016 | Ghosh et al. |
| 2016/0055038 A1 | 2/2016 | Ghosh et al. |
| 2017/0255890 A1* | 9/2017 | Palavalli .......... G06Q 10/06315 |
| 2019/0253485 A1 | 8/2019 | Jyoti |

OTHER PUBLICATIONS

Cloud Standards Customer Council; "Practical Guide to Cloud Management Platforms"; CAGR '17; 2017.
Cisco Systems Inc.; "Planning the Migration of Enterprise Applications to the Cloud"; www.cisco.com/whitepaper. 2010.
IBM; "Method of creating a componentized architecture for unifying resource sharing scenarios in Cloud Computing Environment"; ip.com/IPCOM/000193146D; Feb. 11, 2010.
Anonymously; "Methods and Technique to Find Frequently Used Features and Usecases by Analyzing Production Logs for Applications and Cloud Based Solutions"; ip.com/IPCOM/000249573D, Mar. 3, 2017.
Anonymously; "Method and System for Diagnosing Anomalies and Providing Cloud Performance Identity"; ip.com/IPCOM/000249318D; Feb. 16, 2017.
Anonymously; "A "Cloud Sourcing" System that Recommends the Optimal Resource Configuration Based on a Cloud Workload's Attributes"; ip.com/IPCOM/000236263D; Apr. 15, 2014.
J. Hurwitz www.thoughtsoncloud.com/2016/05/role-visibility-control-hybrid-cloud-2/?cm_mc_uid=98327227086114655457919&cm_mc_sid_50200000=1470054931, May 3, 2016.

* cited by examiner

```
600            L601 Record Number      324
               L602 System Serial No.  23456804
                    L603 System Name   abc13.cust.com L604 Is Virtual   Y
          L605 Processor Architecture  x86_64
                       L606 CPU Type   Intel(R)Xeon(R)E7,4890,v2
                 L607 Processor Speed  2394
             L608 Cores per Processor  15
                     L609 Processors   4
          L610 Number of Logical CPUs  32
                  L611 Total RAM (GB)  512
                L612 Operating System  Windows Server 2003 R2…
                       L613 Software   Confidential Analysis 567
                   L614 Cluster Type   Microsoft Cluster L621 CPS - SL Pub   Y
                     L622 CPS - SL Pvt   N
                     L623 CPS - SL BM    N
                     L624 CPS - CMS      N
                     L625 RAG STATUS     (A) 86.76470588
                   L626 Manual Notes L631 dasd_total   1000
                     L632 dasd_used    800
                     L633 nfs_total    0
                     L634 nfs_used     0
                     L635 san_total    2000
                     L636 san_used     0
                     L637 san_iops     0

L641 is_encryption_reqd   N
                    L642 is_hpc_workload  N
              L643 is_nonstd_connectivity Y
                        L644 is_onprem    N
                   L645 is_cloud_target   Y
                   L646 permitted_geos    Americas
              L647 permitted_countries    US, Canada
                        L648 Env.Type L651 Rules status for Cloud Platform -   T/T/F/T/T//   T/F/T/T/T//
     SoftLayer Public Node (R1..R17)     T/T/T/F/T//   T/T
L652 Rules status for Cloud Platform -   T/T/F/T/T//   T/F/T/T/T//
     SoftLayer Private Node (R1..R17)    T/T/T/F/T//   T/T
L653 Rules status for Cloud Platform -   T/T/F/T/T//   T/T/T/T/T//
     SoftLayer BareMetal (R1..R17)       T/T/T/F/T//   T/T
L654 Rules status for Cloud Platform -   T/T/F/T/T//   T/T/T/T/T//
                    CMS (R1..R17)        T/T/T/F/T//   T/T
```

FIG. 6

COGNITIVE CLOUD MIGRATION OPTIMIZER

TECHNICAL FIELD

The present disclosure relates to cognitive analytics and learning technology, and more particularly to methods, computer program products, and systems for producing optimal cloud migration plans.

BACKGROUND

Conventionally, data centers are often and periodically migrated in order to meet a certain business and/or technological needs. Such migrations are primarily planned based on manual analysis of cloud inventory data provided by client. Also due to the individual nature of each migration and manual development of individual migration plans, each data center migration plan is to be developed from the scratch.

SUMMARY

The shortcomings of the prior art are overcome, and additional advantages are provided, through the provision, in one aspect, of a method. The method includes, for instance: obtaining, by one or more processor, input data from a source environment, including application hosting data of each server in the source environment and one or more cloud types of the source environment; creating, by one or more processor, a list of one or more candidate cloud type of a target platform, based on the input data; screening, by the one or more processor, servers in the source environment that are eligible for migration; selecting, by one or more processors, the target platform by applying, for each candidate cloud type, preconfigured selection rules on the application hosting data of each eligible server in the source environment; and producing, by the one or more processor, migration recommendations for each eligible server in the source environment, including one or more cloud type corresponding to the target platform from the selecting.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6 depicts an exemplary migration recommendation as being presented in the migration recommendations report, in accordance with one or more embodiments set forth herein;

DETAILED DESCRIPTION

Figure 1:
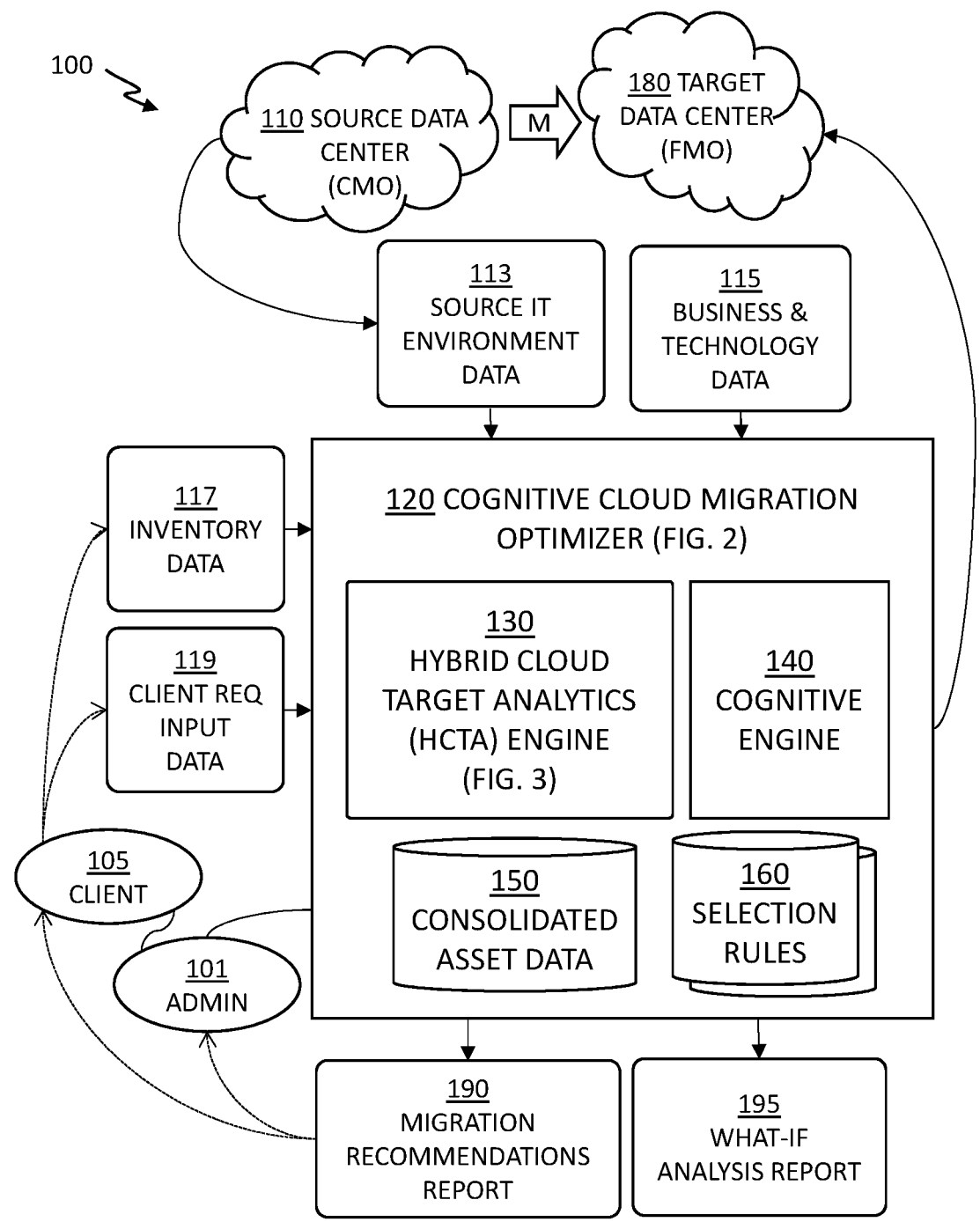
FIG. 1 depicts a system for cognitively optimizing migrations of data centers, in accordance with one or more embodiments set forth herein.

FIG. 1 depicts a system 100 for cognitively optimizing migrations of data centers, in accordance with one or more embodiments set forth herein.

In order to maximize data center performances and/or cost-effectiveness, and to meet emerging business demands, rules, and regulations, data centers are often consolidated and/or divided, and their workloads are migrated to one or more target data center, in whole or in part. Data centers may be proprietary to a certain organization, shared amongst many organizations as offered by a cloud service provider, and combinations thereof. In this specification, term "data center" refers to the physical location/site of servers that provide certain data and/or computing services, or more broadly, a large group of networked computer servers typically used by organizations for the remote storage, processing, or distribution of large amounts of data. In this specification, the term "data center" is used interchangeably with terms "IT environment", "environment", "platform", "cloud", "cloud platform", "cloud servers", or the like.

Migration planning in pre-hybrid cloud era was simply selecting a single cloud type as a target, marking all workloads of a data center as being cloud eligible, and targeting the marked workloads to the selected target environment. However, such migration plans were never fully realized as a large percentage of candidate workloads initially selected were re-targeted to traditionally hosted platforms based on specific processing requirements of respective workloads, business needs of the client organization, difficulty of transformation, or preclusion of migration to the targeted cloud type. Cloud types, since then, have become diversified and a hybrid cloud, which combines more than one type of clouds, emerged. Examples of the cloud types include, but are not limited to, managed or unmanaged clouds according to respective management status of nodes in the clouds, private or public clouds according to respective eligibility for public subscription, shared or dedicated clouds according to respective resource distribution. Accordingly, migration planning for hybrid clouds has become far more complicated than a migration planning in the single-type cloud, as selecting a proper cloud type for respective workload may be a challenge. Also, the complexity of the migration planning increases with, for example, respective rules and regulations on the data center operations imposed by various geographical regions/countries to which data centers are required to comply, a rapid pace of changes in factors affecting the migration including business needs as well as technical trends and available technologies.

Embodiments of the present invention recognize that, although the business and technological needs shift rather rapidly, conventional methods of manually devising a migration plan are often costly to repeat, and accordingly, once the migration plan has been developed, used repeatedly regardless of latest business mandates and technological updates. However, even in hybrid cloud environments, conventional data center migrations are primarily planned based on manual analysis of cloud inventory data provided by clients. Collecting inventory data from the clients may be problematic because the clients often do not know accurate and up-to-date details of the source platform and service workloads as required for migration planning, or because the client is unable to adapt their business/migration decisions to changing circumstances such as new developments in business and technological needs. For example, the clients often miss details such as affinity mappings of the source platform that are technically significant in planning migration but easily overlooked by clients without proper expertise. Manually planning a large scale cloud migration that involves workload images, application software, and data, is not feasible as the application software and the data of the workload images running on the source platform needs to be timely validated in the target platform in order to ensure continuous service provision subsequent to the migration.

Also where each data center migration plan is developed from the scratch individually, such migration plans are not reusable, and accordingly, the time and cost in developing one instance of a migration plan become too much to repeat, revise, and/or adapt to any changing circumstances of a migration.

Although migrations are common and almost unavoidable, making decisions on if and how to migrate a certain workload may be complicated and time consuming. A few examples of factors affecting the migration decision may include, but are not limited to, the number and types of workloads and/or server images to migrate, respective system requirements for workloads and server images to migrate, the number of target cloud platforms to which the workloads and/or server images may migrate, respective system specifications as offered by target cloud platforms, rules and regulations on computing services, various client requirements with respect to target platform performance as well as service level agreement with users.

The latest developments in both business and technology may affect the migration decision as well, either presently or in the long run, as a current business model of the data center subject to migration and the need for the migration are based on such latest developments. Conventionally, migration of data centers focus primarily on technical compatibility at a summary level between the source and the target platforms and decisions are often made manually, resulting in labor intensive migration effort, a lack of warranty of success of migrations and/or performance of migrated workloads, and a lack of scalability or systemic approaches as to other migrations that may be necessary in the future. Particularly with large scale migrations, various workloads are often scheduled for separate migrations to distinctive target platforms as a series of partial migrations over a long period of time where the business/technical environments may change and original migration plans may need to adapt to the latest environment. However, manually developed migration plans may not be adjusted and/or repeated without significant time and effort, and requires significant resources to make any adjustments/adaptations in renewing input data and analyzing new dependencies/migration eligibilities.

Presently available migration planning methods include a manual or assisted target platform selection based on individualized choice of requested platforms as classified in a certain processor architecture and a predetermined cloud type, accompanied by business process rules with service designation for company requirements. In most conventional cloud target selections, decisions are made based on simple parameters such as type of hypervisor, CPU counts, and memory sizes, which are too simplistic and often overestimate cloud eligibility by omitting processor/memory overheads involved in system tools and mid- to low-level software applications that support cloud functionality and data center services. Accordingly, migration objectives are rarely met with the recommendations rendered based on simple parameters, necessitating extra time and effort to put the migration recommendations into practice.

Contrastingly, by use of fully automated discovery of detailed input data on workload characteristics and by use of cognitive analytics in adapting the migration plan to changes in the business and/or technical environment, certain embodiments of the present invention may provide cost-effective and timely migration recommendations.

The system 100 for cognitively optimizing migrations of data centers includes a cognitive cloud migration optimizer 120, a source data center 110, and a target data center 180. The source data center 110 is also referred to as being in Current Mode of Operation (CMO), which indicates the source data center 110 prior to any changes with respect to a migration. Similarly, the target data center 180 is referred to as being in Future Mode of Operation (FMO), which indicates the data center subsequent to a migration including placements and/or replacements of any components, in part or as a whole, from the source data center 110. Arrow M from the source data center 110 to the target data center 180 indicates a migration subject to planning by use of the cognitive cloud migration optimizer 120.

The system 100 for cognitively optimizing migrations of data centers provides a fully automated and systemic approach, which includes comprehensive data discovery with respect to all technical data on workloads and relevant platforms as well as business and technological environments, and cognitive analytics generating recommended migration plans based on the comprehensive data, including data learnt from cognitive learning of unstructured data. Further, the system 100 also offers recommendations on how to remedy certain elements of the workloads that are prohibiting the migration of such workloads from the source data center 110 to the target data center 180 where applicable, such that the images executable on servers in the source data center may qualify for the target data center 180. Accordingly, the system 100 may further narrow down the most eligible cloud type and servers for a certain application, in comparison to conventional migration planning based on assumptions, by utilizing workload characteristics, and technical and regulatory requirements. For example, conventional workload migration planning tools may discover that a server is running SAP in the source data center but are not equipped to determine whether or not the server is a SAP HANA platform eligible and to recommend migration, although SAP HANA platforms can be migrated and also be positioned as a SaaS offering in the target environment. The system 100 effectively provides migration recommendations for multiple hybrid cloud platforms as in aforementioned example, even if matching of servers and respectively eligible cloud types become complicated due to an increased number of migration options that may require optimization analyses on numerous overlapping and/or distinctive migration options.

The cognitive cloud migration optimizer 120 takes inputs including source information technology (IT) environment data 113, business and technology data 115, inventory data 117, and client requirements input data 119. The cognitive cloud migration optimizer 120 includes a hybrid cloud target analytics (HCTA) engine 130, a cognitive engine 140, a consolidated asset data 150, and one or more selection rules 160. The cognitive cloud migration optimizer 120 produces a migration recommendations report 190 and a what-if analysis report 195, and/or performs periodic replacements/placements according to updates in the recommendations produced based on any changes in the inputs and other cognitive data streams in each iteration. Detailed operations of the cognitive cloud migration optimizer 120 are presented in FIG. 2 and corresponding description.

In this specification, term "asset" and "data center asset" are used interchangeably to indicate logical or physical resources in a data center, including, but not limited to, servers, software executables, software licenses, network switches, load balancers, VLANs, security policies; the term "hybrid cloud" indicates a cloud computing environment that includes multiple public and private cloud resources; the term "bare metal" server indicates components pertaining to a computer independent of its operating system or hypervisor, as opposed to virtualized resources; the term "virtualization" indicates substitution of virtual resources for actual resources, where the virtual resources have the same functions and external interfaces as their counterparts, but differ in attributes, such as size, performance, and cost, as being commonly applied to physical hardware resources by combining multiple physical resources into shared pools from which users receive virtual resources; the term "hypervisor" indicates a software on a physical device that enables multiple instances of operating systems to run simultaneously on the same hardware, as often used for virtualized resources forming a cloud/data center.

The cognitive cloud migration optimizer 120 automatically discovers the source IT environment data 113 from the source data center 110. The source IT environment data 113 includes, but are not limited to, one or more cloud type of the data center, application hosting data such as application types, application sizes, affinity groups, security requirements, latency tolerances, applicable regulations, or other data pertaining to workload characteristics per application running in the source data center 110 servicing the workload of the source data center 110.

The cognitive cloud migration optimizer 120 cognitively learns, by use of the cognitive engine 140, the business and technology data 115 from various cognitive tools including, but not limited to, natural language processing (NLP) tools and machine learning tools. The cognitive engine 140 extracts data stream from unstructured data sources such as dark data, interviews, news articles, video clips, website postings, and updates the consolidated asset data 150 with the extracted data. In this specification, the term "dark data" indicates unstructured operational information that an organization of the client 105 collects, processes and stores through the course of regular business activity, but fails to use or apply for other purposes. By use of the cognitive engine 140, the cognitive cloud migration optimizer 120 may utilize various types of unstructured information such as business requirements, objectives of the organization of the client 105, and technical trends in generating target selection recommendation.

Based on the data stream fed by the cognitive engine 140, the cognitive cloud migration optimizer 120 learns technical and business trends, regional/national rules and regulations, as well as interactive feedback from the client 105 and the administrator 101 and makes recommendations on migration decisions and/or to perform migration operations according to preconfigured parameters of the cognitive cloud migration optimizer 120.

A client 105 who has a business stake in the source data center 110 and the target data center 180 provides the inventory data 117 and the client requirements input data 119. The cognitive cloud migration optimizer 120 may obtain the inventory data 117 and the client requirements input data 119 directly via user interface of the cognitive cloud migration optimizer 120, and/or indirectly via interviews and discussions as learned from the cognitive engine 140. An administrator 101 configures various aspects of how the cognitive cloud migration optimizer 120 would operate, and provides feedbacks and/or adjusts configurations of the cognitive cloud migration optimizer 120 based on outputs/performance metrics of the cognitive cloud migration optimizer 120. The administrator 101 may collectively refer to a migration engineer, a solution provider, and/or any other person involved in technical aspects of the migrations.

The hybrid cloud target analytics (HCTA) engine 130 discovers and preprocesses data for, and performs respective analyses on, eligibilities of servers in preconfigured cloud types. The HCTA engine 130 generates the migration recommendations report 190, which specifies server images of the source data center 110 that may migrate to the target data center 180 without any transformational actions, server images of the source data center 110 that may migrate to the target data center 180 with specific transformational actions, also referred to as remedial actions, along with the server images. Details on generation of the migration recommendation report 190 by the HCTA engine 130 are presented in FIG. 2, particularly in block 230 thereof, and corresponding descriptions. The migration recommendations report 190 also may list server images that are unsuitable for migration to target cloud types and reasons of such determinations. Also, the HCTA engine 130 specifies a selection of proper target cloud types for each workload and respective supporting platforms in the migration recommendations report 190.

In one embodiment of the present invention, categories of the cloud types determined by the cognitive cloud migration optimizer 120 include, but are not limited to, a type of cloud referred to as Infrastructure as a Service (IaaS), and another type of cloud referred to as Platform as a Service (PaaS). The IaaS indicates a private or shared, dedicated or multi-tenant cloud that provisions virtual server resources up to the operating system level; and PaaS indicates a private or shared, dedicated or multi-tenant cloud that provisions virtual server resources up to the application level, including the underlying operating system. Depending on the cloud types, the migration planning becomes more complicated as a certain types of clouds present additional conditions such as bare metal server requirements, non-standard platforms such as Solaris; and cloud management requirements that are not automatically discoverable.

The HCTA engine 130 generates the consolidated asset data 150 by automated discovery of data, interactive collection and natural language processing of unstructured data, and direct inputs from the administrator 101 and the client 105. The HCTA engine 130 keeps the consolidated asset data 150 up to date by updating the consolidated asset data 150 corresponding to input streams. The HCTA engine 130 performs selection analyses by applying the selection rules 160 respectively to each candidate cloud/target environment type. The selection rules 160 indicate cloud eligibility selection criteria for each cloud type that is being targeted for migration. Accordingly, certain rules of the selection rules 160 qualify which servers from the source data center 110 can migrate to which cloud types in the target environment. Similarly, certain other rules of the selection rules 160 may specify if the server image qualifies for migration as is, or only after certain remedial actions have been taken. Detailed operations of the HCTA engine 130 are presented in FIG. 3 and corresponding description.

Certain embodiments of the present invention may provide cost-effective and timely migration recommendations, by use of fully automated discovery of detailed input data and cognitive analytics in adapting the migration plan to changes in the business and/or technical environment. Certain embodiments of the present invention utilize accurate, repeatable, and widely applicable screening/selection criteria, based on comprehensive inputs, including but not limited to, a range of automatically discovered server characteristics of all platforms, infrastructure attributes involved in the migration, business and regulatory requirements affecting geographical locations involved in the migration, and other stakeholder inputs with respect to business strategy. Certain embodiments of the present invention provide detailed recommendation on whether or not respective servers in source platforms are eligible for migration to one or more target clouds, with respect to the type of the cloud, including both Infrastructure as a Service (IaaS) and Platform as a Service (PaaS), as well as a hybrid environment across two or more types of clouds. Further certain embodiments of the present invention facilitate a what-if analysis for certain contingency scenarios, before and during the migration in order to guide the migration through such contingencies. Accordingly, certain embodiments of the present invention may contribute to optimal business plans for risk management, in which certain changes that may affect the migration may be foreseen and prepared for or prevented. Certain embodiments of the present invention also provide guidance on remedial actions that are to be taken for a server image to qualify for the migration. Accordingly, migration engineers, and/or the client may take the suggested remedial actions to have a previously disqualified server image rendered eligible for migration/cloud deployment.

Figure 2:
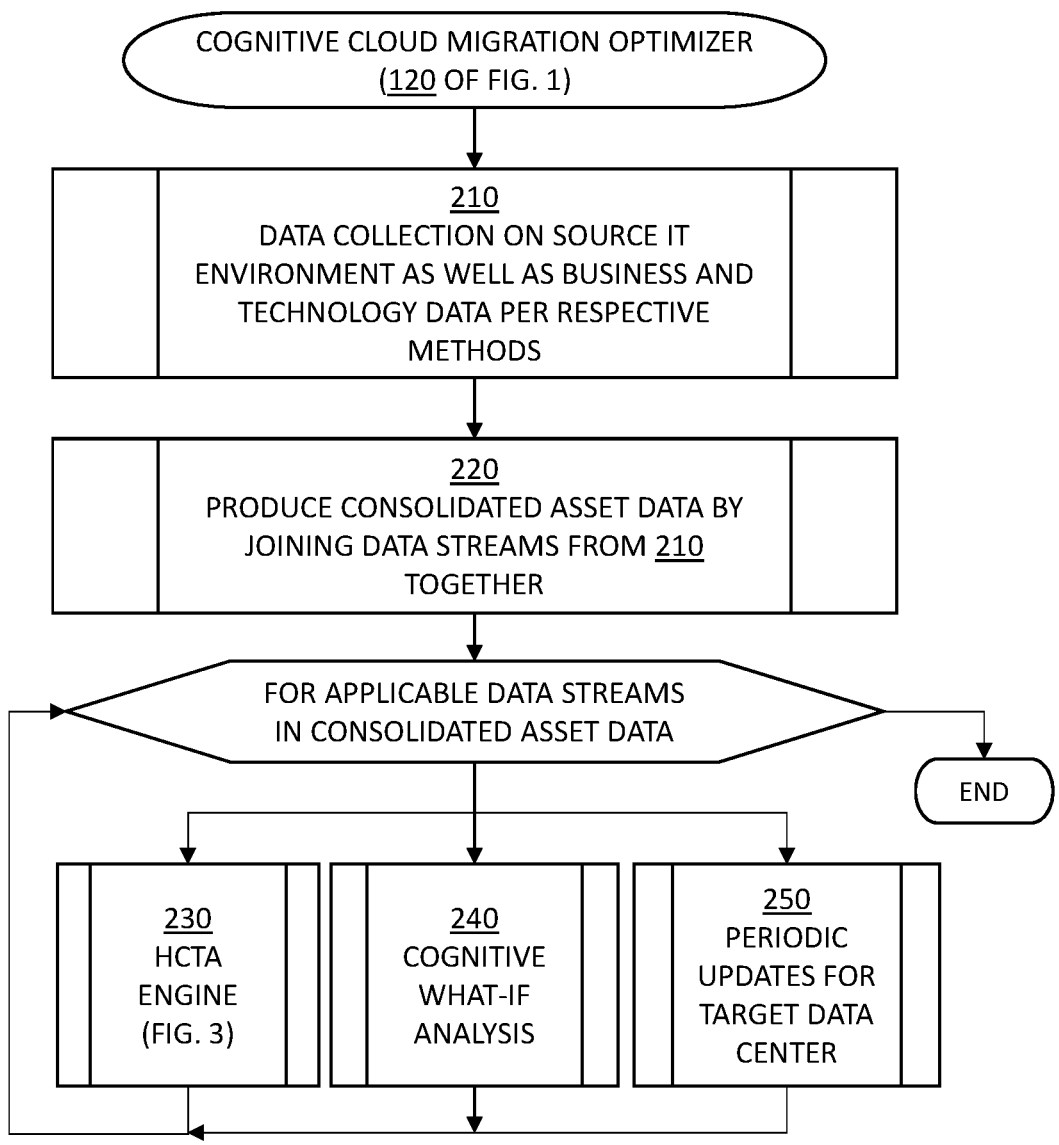
FIG. 2 depicts a flowchart of operations performed by the cognitive cloud migration optimizer, in accordance with one or more embodiments set forth herein.

FIG. 2 depicts a flowchart of operations performed by the cognitive cloud migration optimizer 120, in accordance with one or more embodiments set forth herein.

As noted, the cognitive cloud migration optimizer 120 is a cognitive analytics tool to analyze, learn, and, contextualize inputs on technical and business aspects of data center operations in order to produce the migration recommendations report 190, specifying optimal target cloud selection, and the what-if analysis report 195, as well as to recommend periodic updates to the landing zone of target data center 180 in the Future Mode of Operation (FMO) in response to changes occurring in source datacenter environment. In certain embodiments of the present invention, the cognitive cloud migration optimizer 120 performs the aforementioned migration planning, analysis, and the recommendations of suitable cloud platforms for the target data center 180 by running blocks 230, 240, and 250 concurrently.

In blocks 210 and 220, the cognitive cloud migration optimizer 120 initializes the consolidated asset data 150 for the operations of blocks 230, 240, and 250. As noted, the cognitive cloud migration optimizer 120 continuously gathers data from source clouds of distinctive types, user defined tables, historical artifacts, new technology inputs, interview notes from the client 105 in text, and varying business decisions and customer requirements, and stores in the consolidated asset data 150. The cognitive cloud migration optimizer 120 operates upon each record from applicable data streams in the consolidated asset data 150, in blocks 230, 240, and 250.

In block 210, the cognitive cloud migration optimizer 120 collects cloud asset information, workload characteristics, application affinities, associated business and regulatory requirements and other inputs pertaining to the source environment from a variety of sources. In certain embodiments of the present invention, the cognitive cloud migration optimizer 120 collects such workload characteristics data and cognitive landscape data encompassing business and technical aspects from structured data sources as well as unstructured data sources by use of natural language processing tools. The cognitive cloud migration optimizer 120 sets up a continuous input data stream where applicable, such that in blocks 230 through 250, the consolidated asset data 150 would be up to date in each iteration. Then the cognitive cloud migration optimizer 120 proceeds with block 220.

The cognitive cloud migration optimizer 120 also stores preconfigured information pertaining to each selection criterion that precludes some source images from migrating to a cloud, in the selection rules 160. Accordingly, the cognitive cloud migration optimizer 120 not only selects workloads/server images qualified for migration but also identifies selection criteria for exclusion and selection criteria for remediation in the source environment for disqualified server images, respectively, from the selection rules 160. Detailed operations based on the selection criteria, as represented in the selection rules 160, are presented in FIG. 4 and corresponding description. One exemplary embodiment of the selection criteria, that is, the selection rules 160, is presented in FIG. 5 and corresponding description.

In block 220, the cognitive cloud migration optimizer 120 produces the consolidated asset data 150 as initialized by joining the data streams from block 210. The cognitive cloud migration optimizer 120 begins performing blocks 230, 240 and 250, with the consolidated asset data 150 as initialized, and while performing blocks 230, 240, and 250, the cognitive cloud migration optimizer 120 continuously updates the consolidated asset data 150. The consolidated asset data 150 are of a varying nature according to status snapshot of the technical aspects of the servers/workloads of the source data center 110, as well as various business policy and regulatory inputs and live feed streams. Each record of the consolidated asset data 150 represents a server in the source data center 110 and all attributes of the server to be analyzed to plan the migration. Then the cognitive cloud migration optimizer 120 proceeds with blocks 230, 240, and 250.

As noted, the cognitive cloud migration optimizer 120 performs blocks 230, 240, and 250 concurrently by use of various multi-tasking/parallel computing methodologies.

In block 230, the cognitive cloud migration optimizer 120 performs the Hybrid Cloud Target Analytics (HCTA) engine 130. In one embodiment of the present invention, the HCTA engine 130 of the cognitive cloud migration optimizer 120 runs repeatedly at various stages of data collections to engage with the client 105 who has a business stake on the migration, and develops migration plans throughout a migration project, as a migration is gradually performed over a period of time. The HCTA engine 130 generates the migration recommendations report 190 that determines the migration eligibility of each server image in the source data center 110 to a pre-chosen set of target cloud platforms, which is customizable to add or substitute various cloud platforms, indicating the target data center 180, using a number of selection criteria as stored in the selection rules 160 and target cloud characteristics, as represented in the consolidated asset data 150. The HCTA engine 130 also continuously updates the consolidated asset data 150 in order to produce the migration plan based on the latest information available. The HCTA engine 130 generates the migration recommendations report 190 by accurately mapping between business and technical environments of the source data center 110 and corresponding business and technical environments of the target data center 180, based on various data from the consolidated asset data 150. According to the migration recommendation report 190, the cognitive cloud migration optimizer 120 may engage other automation tools in order to perform end-to-end orchestration of individual migration activities. Detailed operations of the HCTA engine 130 are presented in FIGS. 3 and 4 and corresponding descriptions. Then the cognitive cloud migration optimizer 120 executes the HCTA engine 130 repeatedly for applicable data streams and/or updated records in the consolidated asset data 150.

In block 240, the cognitive cloud migration optimizer 120 performs a cognitive what-if analysis, in which the cognitive cloud migration optimizer 120 analyzes prospective changes that may affect the migration plan of the source data center 110 to the target data center 180, and produces a corresponding what-if analysis report. The changes that are subject to the what-if analysis may include, but are not limited to, technical, business, and/or regulatory changes as well as trends in changes in the IT environment in which the source data center 110 and/or the target data center 180 operate, in order to assist stakeholders of the migration to make optimal business decision under various potential circumstances. With the what-if analyses, the cognitive cloud migration optimizer 120 guides the migration planning with various contingencies, by running various scenarios. Then the cognitive cloud migration optimizer 120 performs the what-if analysis repeatedly for all applicable data streams and/or updated records in the consolidated asset data 150.

In block 250, the cognitive cloud migration optimizer 120 performs periodic updates for the target data center 180, by recommending changes in the landing zone of the target data center 180, according to new workloads and any other changes discovered in the source data center 110, as added and otherwise changed during a preconfigured period. The new workloads and other changes in the source data center 110 may include, but are not limited to, Shadow IT systems and solutions that are deployed inside a certain department instead of being provided by an IT department, and accordingly, that had not been initially input as the source IT environment data 113. For example, if the new workload W1 in the source data center 110 deals with personal information and is regulated by law to be stored in certain private locations with a certain security measures, then the cognitive cloud migration optimizer 120 recommends the landing zone of the target data center 180 for the new workload W1 to have the acceptable level of private location and security measures, or recommends another landing zone of the target data center 180 that already has similar privacy with location and security measures.

The cognitive cloud migration optimizer 120 terminates the analyses and updates in blocks 230, 240, and 250 once all records in the consolidated asset data 150 had been processed and/or the migration had been completed. In order to ensure that the migration plan and results from the analyses are based on the latest information affecting the source data center 110 and the target data center 180, even after the migration begins, the cognitive cloud migration optimizer 120 may be configured to run repeatedly for certain updates of the consolidated asset data 150 during the migration and produces new reports accordingly.

Figure 3:
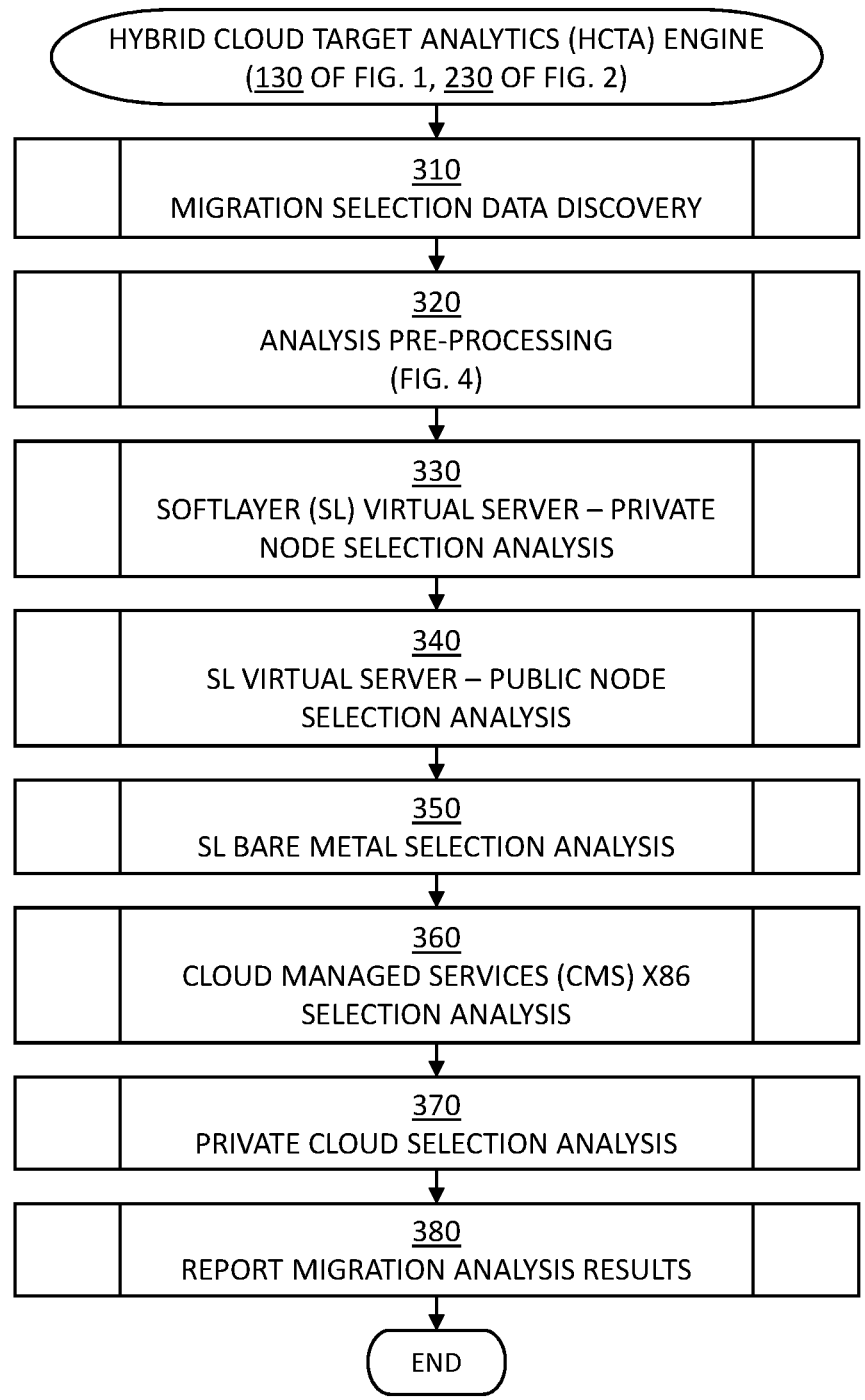
FIG. 3 depicts a flowchart of operations performed by the Hybrid Cloud Target Analytics (HCTA) engine of the cognitive cloud migration optimizer, in accordance with one or more embodiments set forth herein.

FIG. 3 depicts a flowchart of operations performed by the Hybrid Cloud Target Analytics (HCTA) engine 130 of the cognitive cloud migration optimizer 120, in accordance with one or more embodiments set forth herein.

The HCTA engine 130 discovers and stores the discovered information in a proprietary database, the consolidated asset data 150, and/or utilizes as inputs to various subprocesses of the HCTA engine 130. The HCTA engine 130 subsequently analyzes the discovered migration data to target a combination of all viable cloud types per server image and to determine if certain cloud types may or may not be target cloud candidates due to certain preclusion from the migration.

In block 310, the HCTA engine 130 performs data discovery for migration selection by developing hosting information. The HCTA engine 130 may perform data discovery concurrently for various data sources and/or sequentially in stages based on respective types of data and significance on the migration plan. Then the HCTA engine 130 proceeds with block 320.

The HCTA engine 130 in block 310 obtains inputs on cloud types and application hosting data for each application of the source data center 110. In order to migrate each application of the source data center 110 to a correct cloud in the target data center 180, the HCTA engine 130 develops a specific list of the candidate target cloud types based on the inputs of the source cloud types and the application hosting data. Examples of cloud types may include, public/private, shared/dedicated, on-premises/off-premises, and any other categories that characterize cloud operations. Examples of the application hosting data may include, a type and size of an application, one or more affinity group of the application, a tolerance for latency, and various factors affecting the migration, the usage and throughput of the cloud operations, with respect to regulations by geographical and/or national boundaries, business policy and client request, as well as technological trend and recent developments.

For each applications/server image in the source data center 110, the HCTA engine 130 maps out specific platforms and services provided by respective applications/server images. The HCTA engine 130 breaks down the mapping information into component criteria for detailed element-by-element comparison between the hosting information of source applications/services and requirements of target applications/services after the migration. Examples of the component criteria for respective application/server images include, but are not limited to processing capacity, as represented by a processor type, clock speed; the size of memory; the type and size of storage; security requirements; latency thresholds; and software requirements including, but not limited to, the type/version of Operating System (OS), middleware, database, or other types of software environment requires for the respective applications/services.

In one embodiment of the present invention, the HCTA engine 130 develops the hosting information in a number of stages, beginning with asset inventories received as raw data, and subsequently augmenting the hosting information with information through automated data discovery tools of the HCTA engine 130, and further supplementing the hosting information with interactive inputs from interviews and questionnaires such as Application Assessment Questionnaire (AAQ), and business decisions, in respective stages. Users involved in the migration planning may include, but are not limited to, the client 105, and the administrator 101 of the cognitive cloud migration optimizer 120, as noted in FIG. 1. The client 105 is any entity and/or person which has a business interest in the source data center 110, the migration, and/or the target data center 180. The administrator 101 is any entity and/or person which supports the technical aspects of the source data center 110, the migration, and/or the target data center 180 such as a provider of a cloud solution, and a migration engineer.

The HCTA engine 130 automatically normalizes the discovered data. The HCTA engine 130 may employ interactive tools for polling business decisions in the interviews and questionnaires, and natural language processing (NLP) tools for processing unstructured natural language responses obtained from the interviews and questionnaires as well technology trends from news feeds, into digital data. Examples of natural language processing (NLP) tools utilized by the HCTA engine 130 may include, speech-to-text parser, natural language classifier (NLC), etc. In order to adapt to any changes to the infrastructure of the source data center (CMO) 110 before and during the migration and to offer an optimal migration plan based on the latest information even with such changes, the HCTA engine 130 may be configured to run repeatedly upon being triggered by certain preconfigured events and/or periodically.

In block 320, the HCTA engine 130 pre-processes the inputs from block 310 for analysis, by applying pre-configured cloud selection rules 160 in a specific order. During the preprocessing of block 320, the HCTA engine 130 may perform categorical screening and cloud migration eligibility test for each server/application according to the inputs discovered in block 310. The HCTA engine 130 determines which server/application is eligible for migration, and to which type of target clouds, as a result. Detailed operations of the analysis pre-processing in block 320 are described in FIG. 4 and corresponding description. Then the HCTA engine 130 proceeds with block 330.

In block 330, the HCTA engine 130 selects private nodes for the SoftLayer (SL) Virtual server. In one embodiment of the present invention, the HCTA engine 130 reapplies pre-configured node selection rules 160 as utilized in preprocessing of the categorical analysis to all nodes that had been determined as being eligible for migration in block 320, and selects the private nodes for SoftLayer (SL) Virtual server as a result, based on collective determination on each rule from the selection rules 160. Then the HCTA engine 130 proceeds with block 340.

In block 340, the HCTA engine 130 selects public nodes for the SoftLayer (SL) Virtual server. In one embodiment of the present invention, the HCTA engine 130 reapplies pre-configured node selection rules 160 as utilized in preprocessing of the categorical analysis to all nodes that had been determined as being eligible for migration in block 320, and selects the public nodes for SoftLayer (SL) Virtual server as a result, based on collective determination on each rule from the selection rules 160. Then the HCTA engine 130 proceeds with block 350.

In block 350, the HCTA engine 130 selects nodes for the SoftLayer (SL) Bare Metal server. In one embodiment of the present invention, the HCTA engine 130 reapplies pre-configured node selection rules 160 as utilized in preprocessing of the categorical analysis to all nodes that had been determined as being eligible for migration in block 320, and selects the SL Bare Metal server nodes, based on collective determination on each rule from the selection rules 160. Then the HCTA engine 130 proceeds with block 360.

In block 360, the HCTA engine 130 selects nodes for the Cloud Managed Services (CMS) x86 server. In one embodiment of the present invention, the HCTA engine 130 reapplies pre-configured node selection rules 160 as utilized in preprocessing of the categorical analysis to all nodes that had been determined as being eligible for migration in block 320, and selects the CMS x86 server nodes, based on collective determination on each rule from the selection rules 160. Then the HCTA engine 130 proceeds with block 370.

In block 370, the HCTA engine 130 analyzes the nodes of the source data center 110 in order to determine if the nodes should be migrated to private clouds on-premises in the target data center 180 by applying selection rules for private clouds. Based on security requirements and/or regulatory demands from the source IT environment data 113 and the cognitive business and technology data 115, the HCTA engine 130 determines the nodes that must be migrated into one or more private nodes. In one embodiment of the present invention, the HCTA engine 130 reapplies pre-configured node selection rules 160 as utilized in preprocessing of the categorical analysis to all nodes that had been determined as being eligible for migration in block 320, and selects the nodes designated for the private clouds in the target data center 180, based on collective determination on each rule from the selection rules 160. Then the HCTA engine 130 proceeds with block 380.

In block 380, the HCTA engine 130 reports the result of the analyses in blocks 320 through 370 in the migration recommendations report 190, which lists preferable target cloud types and servers/applications from the source data center 110 to migrate into respective preferable target cloud types. Then the HCTA engine 130 terminates processing for the data discovered in block 310.

Figure 4:
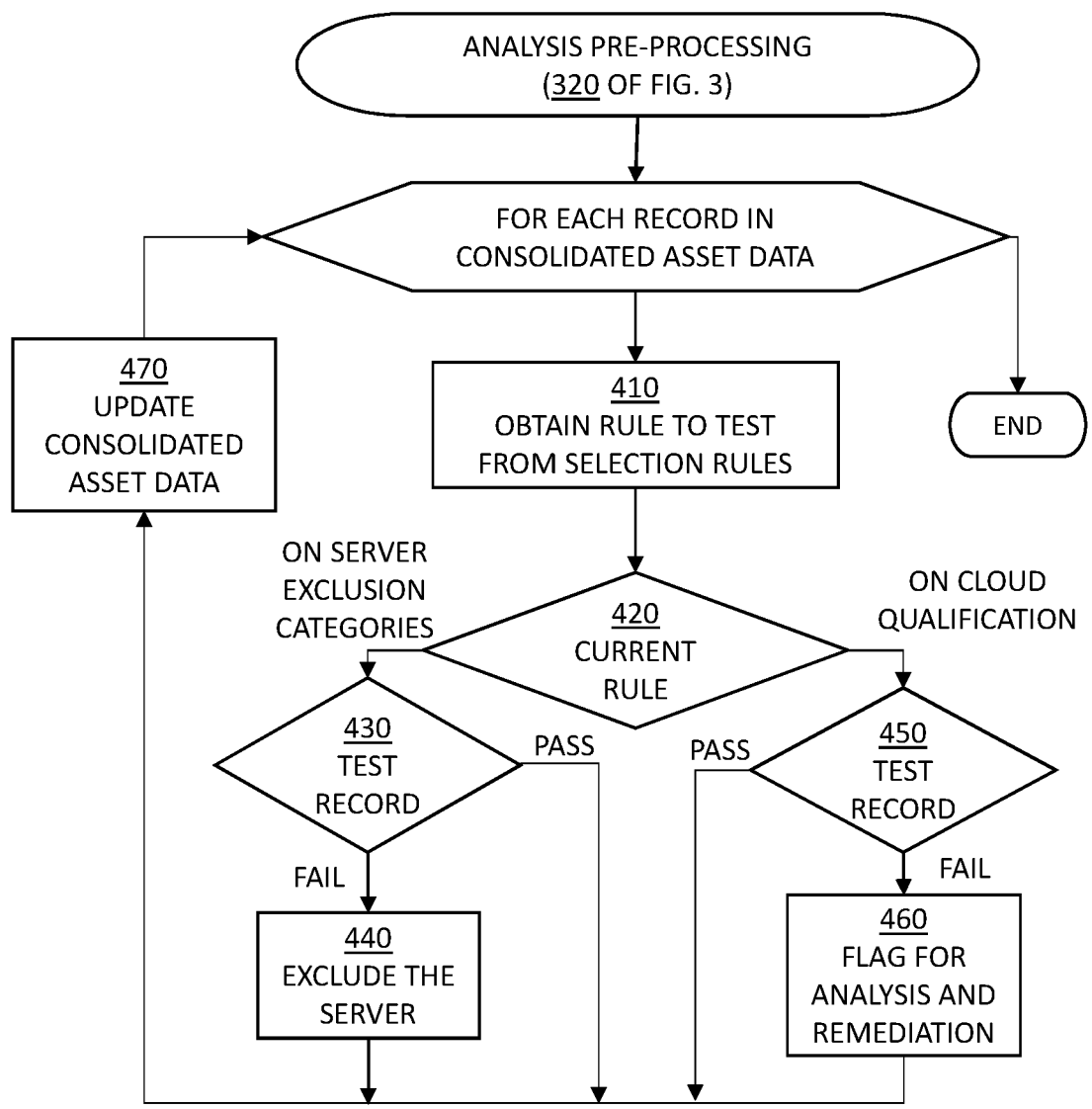
FIG. 4 depicts a flowchart of operations performed by the HCTA engine for analysis pre-processing, in accordance with one or more embodiments set forth herein.

FIG. 4 depicts a flowchart of operations performed by the HCTA engine for analysis pre-processing in block 320 of FIG. 3, in accordance with one or more embodiments set forth herein.

The HCTA engine 130 discovers and stores hosting information pertaining to each selection criterion that precludes some source images from migrating to a cloud. In block 320, the HCTA engine 130 performs preprocessing for cloud selection analysis by identifying selection criteria for exclusion. For disqualified server images, the HCTA engine 130 may identify selection criteria for remediation in the source environment. The term "pre-processing" indicates that the HCTA engine 130 tests server image asset records of the source data center 110 for any deficiencies in the expected input or the exclusion from the migration and/or any remediation for disqualified server images, prior to analyzing the server images for target cloud selection.

The HCTA engine 130 performs certain subsets of blocks 410 through 470 as a unit for each record in the consolidated asset data 150, which represents a corresponding server image in the source data center 110.

In block 410, the HCTA engine 130 obtains a current rule to check against a current record from the selection rules 160, according to a predefined configuration for the analysis pre-processing. As noted, the current record corresponds to a current server image in the source data center 110 that is subject to pre-processing in a current iteration of blocks 410 through 470. Then the HCTA engine 130 proceeds with block 420.

In certain embodiments of the present invention, the HCTA engine 130 may be configured to test the current record with server exclusion rules based on regulatory requirements, client setting, and/or CPU architecture in a certain order, followed by qualification rules. Accordingly, the HCTA engine 130 would test the current record with qualification rules only when the current record had not been excluded after the server exclusion test. The HCTA engine 130 would further test the current record with additional requirement and/or remedial rules for disqualified servers, only when the current record represents a server in the source data center 110 that had not been excluded from migration but had been disqualified due to other reasons that may be analyzed and learned for migration planning in the future or that may be remedied to qualify for the present migration.

In block 420, the HCTA engine 130 determines a type for the current rule to test, as obtained in block 410. If the HCTA engine 130 determines that the current rule is of server exclusion categories, then the HCTA engine 130 proceeds with block 430. If the HCTA engine 130 determines that the current rule is of categories on cloud qualification for additional requirements other than server exclusion, then the HCTA engine 130 proceeds with block 460.

In block 430, the HCTA engine 130 tests the current record with the server exclusion rule. If the HCTA engine 130 determines that the current server of the current record is not in accordance with the server exclusion rule, then the HCTA engine 130 proceeds with block 440. If the HCTA engine 130 determines that the current server of the current record is in accordance with the server exclusion rule, then the HCTA engine 130 proceeds with block 470.

In block 440, the HCTA engine 130 excludes the current server of the current record from the present migration plan, as the current server is not in accordance with the server exclusion rule due to reasons of client policy, regulation, and/or technical limitations. Then the HCTA engine 130 proceeds with block 470.

In block 450, the HCTA engine 130 tests the current record with the cloud qualification rule, as determined from block 420. If the HCTA engine 130 determines that the current server of the current record is not in accordance with the cloud qualification rule, then the HCTA engine 130 proceeds with block 460. If the HCTA engine 130 determines that the current server of the current record is in accordance with the cloud qualification rule, then the HCTA engine 130 proceeds with block 470.

In block 460, the HCTA engine 130 flags the current server of the current record for additional analysis for qualification and any remediation that may qualify the current server for the present migration, as the current server has not been qualified for not being in accordance with the cloud qualification rule. Then the HCTA engine 130 proceeds with block 470.

In block 470, the HCTA engine 130 updates the consolidated asset data 150 by adding the current record representing the current server to the consolidated asset data 150. The HCTA engine 130 may forward the current record for further analysis and machine learning tools as training data for future migration planning. Then the HCTA engine 130 loops back to block 410 with next record representing another server in the source data center 110. The HCTA engine 130 proceeds with block 330 of FIG. 3 after processing blocks 410 through 470 for all records in the consolidated asset data 150.

Figure 5:
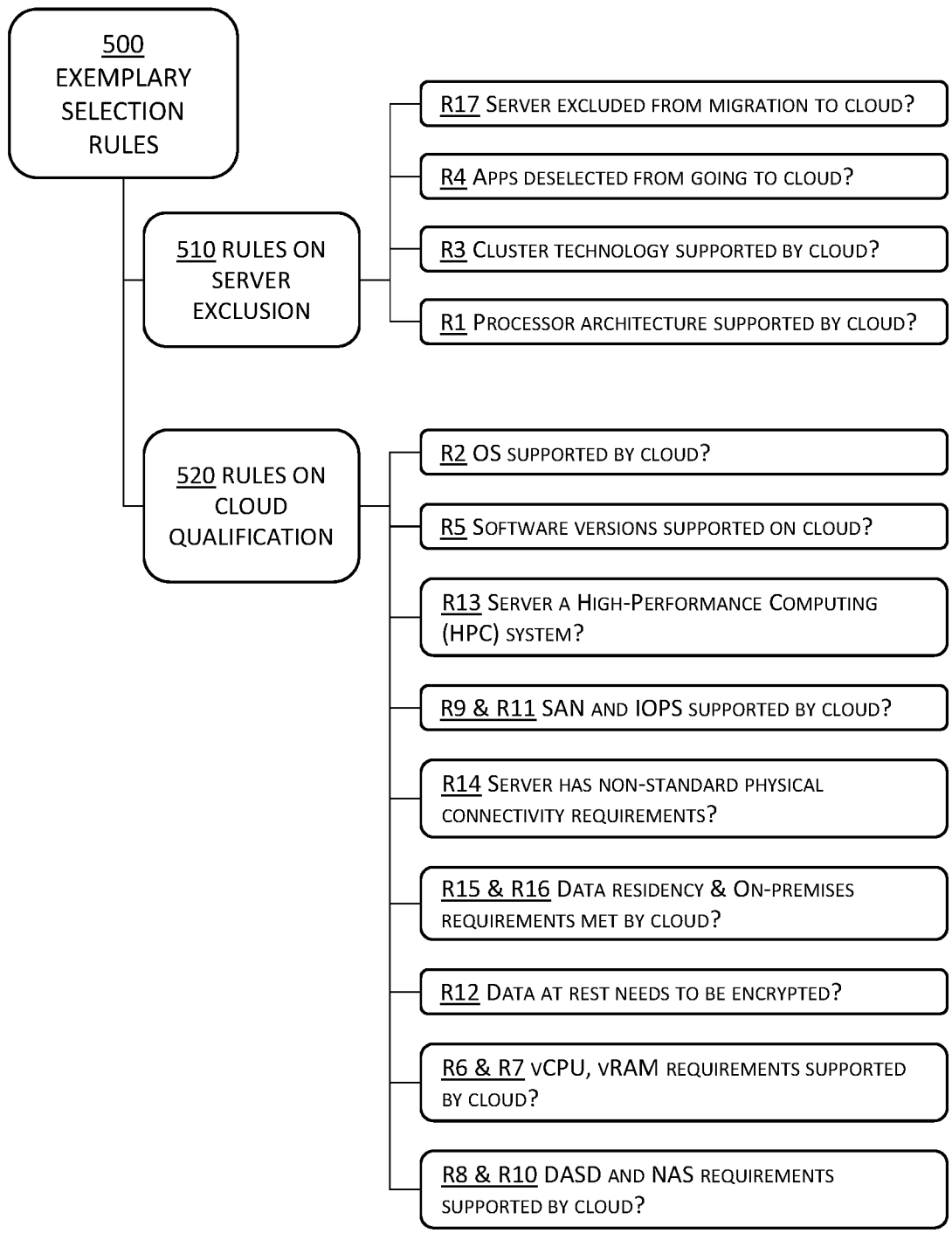
FIG. 5 depicts exemplary selection rules used by the cognitive cloud migration optimizer, in accordance with one or more embodiments set forth herein.

FIG. 5 depicts exemplary selection rules 500 used by the cognitive cloud migration optimizer 120, in accordance with one or more embodiments set forth herein.

As noted, in analysis pre-processing operations of FIG. 4, the HCTA engine 130 checks each record corresponding to a server in the source data center 110 against a series of selection rules 160. The exemplary selection rules 500 presented herein is an instance of the selection rules 160 as sequenced for screening the servers for cloud eligibility in the target cloud selection analysis. The rules R1 through R17 are either of a server exclusion category 510 or of a cloud qualification category 510.

The HCTA engine 130 first selects rule R17 inquiring whether or not the server image is to be excluded from migration to a cloud. The rule R17 is of a server exclusion category, as being determined in block 420 of FIG. 4. If the HCTA engine 130 determines that the current server did not pass the rule R17 test in block 430, then the HCTA engine 130 proceeds with block 440 of FIG. 4, as the current server had been excluded from migration by the client 105 and/or the administrator 101, because of business policy, technical, security, and/or regulatory reasons not to put the server on a cloud.

The HCTA engine 130 then selects rule R2 inquiring whether or not the operating system (OS) of the current server is supported by a cloud. The rule R2 is of a cloud qualification category, as being determined in block 420 of FIG. 4. If the HCTA engine 130 determines that the current server did not pass the rule R2 test in block 450, then the HCTA engine 130 proceeds with block 460 of FIG. 4, as the operating system of the current server is not supported in any cloud available for migration, and may be further analyzed and/or remedied to qualify for migration.

The HCTA engine 130 then selects rule R4 inquiring whether or not applications running on the current server had been deselected from migration to a cloud. The rule R4 is of a server exclusion category, as being determined in block 420 of FIG. 4. If the HCTA engine 130 determines that the current server did not pass the rule R4 test, then the HCTA engine 130 proceeds with block 440 of FIG. 4, as the applications running on the current server had been excluded from migration.

The HCTA engine 130 then selects rule R5 inquiring whether or not software versions running on the current server is supported by a cloud. Examples of the software relevant to migration eligibility include, but are not limited to, a hypervisor, a guest OS. The rule R5 is of a cloud qualification category, as being determined in block 420 of FIG. 4. If the HCTA engine 130 determines that the current server did not pass the rule R5 test in block 450, then the HCTA engine 130 proceeds with block 460 of FIG. 4, as the software versions of the current server is not supported in any cloud available for migration, and may be further analyzed and/or remedied to qualify for migration.

The HCTA engine 130 then selects rule R13 inquiring whether or not the current server is a high performance computing (HPC) system. The rule R13 is of a cloud qualification category, as being determined in block 420 of FIG. 4. If the HCTA engine 130 determines that the current server did not pass the rule R13 test in block 450, then the HCTA engine 130 proceeds with block 460 of FIG. 4, as the current server is a HPC system not supported in any cloud available for migration, and may be further analyzed and/or remedied to qualify for migration. In cases where the target data center 180 supports the HPC system, the HTCA engine 130 may determine that the rule R13 test had not failed even if the current server is the HPC system, because the current server may still be eligible for migration.

The HCTA engine 130 then selects rule R3 inquiring whether or not cluster technology of the current server is supported by the target cloud. The rule R3 is of a server exclusion category, as being determined in block 420 of FIG. 4. If the HCTA engine 130 determines that the current server did not pass the rule R3 test, then the HCTA engine 130 proceeds with block 440 of FIG. 4, as the current server had been excluded from migration.

The HCTA engine 130 then selects rules R9 & R11 inquiring whether or not the Storage Area Network (SAN) storage requirements and Inputs/Outputs per Second (IOPS) of the current server, respectively, is supported by the target clouds. The rules R9 & R11 are of a cloud qualification category, as being determined in block 420 of FIG. 4. If the HCTA engine 130 determines that the current server did not pass the rules R9 & R11 test in block 450, then the HCTA engine 130 proceeds with block 460 of FIG. 4, as the SAN storage requirements and data interface speed as measured in IOPS of the current server is not supported in any cloud available for migration, and may be further analyzed and/or remedied to qualify for migration. In cases where the target data center 180 supports certain features that may support the SAN storage requirements and the data interface speed of the current server, the HTCA engine 130 may determine that the rules R9 & R11 test had not failed even if the requirements of the current server are not supported, because the current server may still be eligible for migration after remediation.

The HCTA engine 130 then selects rule R1 inquiring whether or not a processor architecture of the current server is supported by the target cloud. Examples of the processor architecture may include, but are not limited to, x86 series, p series, z series. The rule R1 is of a server exclusion category, as being determined in block 420 of FIG. 4. If the HCTA engine 130 determines that the current server did not pass the rule R1 test, then the HCTA engine 130 proceeds with block 440 of FIG. 4, as the current server had been excluded from migration.

The HCTA engine 130 selects the rest of the selection rules of the cloud qualification category, after determining that the current record passed rule R1 test, indicating that the processor architecture of the current server is supported by the target cloud. The cloud qualification rules include: rule R14 inquiring whether or not the current server has non-standard physical connectivity requirements; rules R15 & R16 inquiring, respectively, whether or not the data residency requirements and the on-premises requirements of the current server are supported by the target clouds; rule R12 inquiring whether or not data at rest needs to be encrypted; rules R6 & R7 inquiring, respectively, if vCPU and vRAM requirements of the current server are supported by the target cloud; and rules R8 & R10 inquiring, respectively, if Direct access storage device (DASD) and Network-attached Storage (NAS) requirements of the current server are supported by the target cloud. As noted, the current server which had been disqualified because of the failure to pass the tests for the cloud qualification rules may be analyzed and a remedial action may be taken in order to qualify the current server that is not currently eligible for migration.

Amongst the exemplary selection rules 500, the server exclusion rules of R1, R3, R4, and R17 are set by a migration engineer who takes care of technical details regarding the migration plan, in order to exclude the current server from migration where the current server is fundamentally ineligible for the migration and/or intentionally set aside from the migration. Amongst the exemplary selection rules 500, the cloud qualification rules of R2, R5, R13, R9, R11, R14, R15, R16, R12, R6, R7, R8, and R10 are set to forward a certain disqualification for migration on the current server for further analysis and remedial actions to correct the disqualifying condition for the current server. The HCTA engine 130, or the cognitive cloud migration optimizer 120, may utilize external tools to analyze the disqualifying conditions, and may provide a set of training data including the disqualifying conditions and respective corresponding remedial actions. The set of training data may be integrated with the business and technology data 115 for the cognitive cloud migration optimizer 120 by use of machine learning.

FIG. 6 depicts an exemplary migration recommendation 600 as being presented in the migration recommendations report 190 of FIG. 1, in accordance with one or more embodiments set forth herein.

The cognitive cloud migration optimizer 120, by use of the HCTA engine 130, generates the migration recommendations report 190 on target server selections based on a snapshot of the consolidated asset data 150. Accordingly, it would be desirable to re-generate the migration recommendations report 190 as the consolidated asset data 150 change because of additions, deletions, and/or modifications to asset data of server/application images subject to the migration. Such changes in the consolidated asset data 150 may be automatically monitored by use of currently available benchmark tools. In certain embodiments of the present invention, the cognitive cloud migration optimizer 120 may be configured to generate the migration recommendations report 190 initially at the beginning of migration planning for a preliminary analysis of target selections, and then to re-generate the migration recommendations report 190 periodically throughout stages of the migration planning in order to keep up with inputs 113, 115, 117, and 119 from the source data center 110 as being developed over time and normalized into the consolidated asset data 150.

The exemplary migration recommendation 600 represents one record out of several hundreds of records in the migration recommendations report 190. In one embodiment of the present invention, where the migration recommendations report 190 is generated by use of currently available spread sheet tools such as Microsoft Excel, the exemplary migration recommendation 600 is a row from a report sheet for image mapping. In the same embodiment of the present invention, columns in the image mapping sheet are described as numbered line items L601-L654 on the left, respectively or collectively. In the exemplary migration recommendation 600, values corresponding to the line items L601-L654 are presented on the right.

Line L601 indicates a record number of the exemplary migration recommendation 600 within the migration recommendations report 190, having a value of "324". As noted, the migration recommendations report 190 may include several hundred or more number of records, respectively corresponding to each server/application images participating in the source data center 110.

Lines L602 through L614 indicate basic information on the server image, virtual machines (VMs), and/or servers, which is an element of the hypervisor/workload data. The source IT environment data 113 of the source data center 110 describing the application hosting information include the hypervisor/workload data. Basic workload characteristics may be obtained from various input paths as specified in FIG. 1 and corresponding description. Line L602 indicates a manufacturer-assigned serial number of hardware for the system represented in the exemplary migration recommendation 600, having a value of "23456804". Line L603 indicates a logical name of the system as set by a user of the system represented in the exemplary migration recommendation 600, having a value of "abc13.cust.com". Line L604 indicates if the system is either a virtual server or a physical server, having a value of "Y" specifying that the system of the exemplary migration recommendation 600 is virtual. Line L605 specifies the processor architecture of the system, having a value of "x86_64" indicating that the system of the exemplary migration recommendation 600 has x86-64 bit processor architecture. Line L606 specifies a manufacturer-assigned processor model name/number for one or more CPU for the system represented in the exemplary migration recommendation 600, having a value of "Intel®Xeon®E7, 4890,v2". Line L607 specifies the speed, in Gigahertz (GHz), of the processor in L606, having a value of "2394". Line L608 specifies the number of processing cores of the processor in L606, having a value of "15". Line L609 specifies how many processors of L606 are in the system of the exemplary migration recommendation 600, having a value of "4". Line L610 specifies how many logical CPUs at a VMware level operates in the system of the exemplary migration recommendation 600, having a value of "32". Line L611 specifies the size of a random access memory (RAM), in Gigabytes GB), of the system of the exemplary migration recommendation 600, having a value of "512". Line L612 specifies the operating system (OS) running in the system of the exemplary migration recommendation 600, having a value of "Windows Server 2003 R2 . . . ". Line L613 specifies application software running on the system of the exemplary migration recommendation 600, having a value of "Confidential Analysis 567". Line L614 specifies the type of optional cluster for the system of the exemplary migration recommendation 600, having a value of "Microsoft Cluster".

Lines L621 through L626 indicate Cloud Platform Support (CPS) for various types of cloud platform that may or may not support the server image specified in lines L602 through L614 to migrate into and to perform the workload so described based on this preliminary analysis. "CPS-SL Pub" from line L621 identifies an IBM SoftLayer Public type of cloud, having a value of "Y", indicating that the IBM SoftLayer Public type of cloud supports the server image of L602-L614. "CPS-SL Pvt" from line L622 identifies an IBM SoftLayer Private type of cloud, having a value of "N", indicating that the IBM SoftLayer Private type of cloud does not support the server image of L602-L614. "CPS-SL BM" from line L623 identifies an IBM SoftLayer Bare Metal Server type of cloud, having a value of "Y", indicating that the IBM SoftLayer Bare Metal Server type of cloud supports the server image of L602-L614. "CPS-CMS" from line L624 identifies an IBM Cloud Managed Services type of cloud, having a value of "N", indicating that the IBM CMS type of cloud does not support the server image of L602-L614.

RAG STATUS of line L625 specifies Red/Amber/Green (RAG) classification for the workload of the exemplary migration recommendation 600, indicating the confidence level on the likelihood for the workload to be eligible for migration to cloud environment, where Green means the input data is adequate to run the analysis of the HCTA engine 130, Amber means some input data is missing for which standard assumptions were made to suggest a target platform, Red means significant key data is missing but a selection was still suggested for further discussions based on certain assumptions. RAG STATUS of line L625 has a value of "(A) 86.76470588", indicating the color code is Amber, and the confidence level is about 86.76 percent (%). In cases where the RAG STATUS is Amber or Red, the migration engineer is notified to review the findings of the Rules Status for various cloud types in lines L651 through L654, to correct data of a subject record, and to run the analysis of the HCTA engine 130 for the subject record and/or the entire records of the consolidated asset data 150. Manual Notes in line L626 are for the migration engineer to keep a note for correction/analysis history, or any events/actions worth commenting on key servers during the migration planning.

Lines L631 through L637 indicate storage information. "dasd_total" of line L631 specifies the total size of Directly Attached Storage Device (DASD), indicating disk arrays utilizing redundant array of independent disks (RAID) schemes or the like for direct accesses, in the system of the exemplary migration recommendation 600, having a value of "1000". "dasd_used" of line L632 specifies the number of used devices in the DASD of L631, having a value of "800". "nfs_total" of line L633 specifies the total size of Network Attached File System storage devices, having a value of "0". "nfs_used" of line L634 specifies the number of used devices in the NFS of L633, having a value of "0". "san_total" of line L635 specifies the total size of Storage Area Network File System storage devices, having a value of "2000". "san_used" of line L636 specifies the number of used devices in the SAN of L635, having a value of "0". "san_iops" of line L636 specifies the speed of the SAN file system in number of Inputs/Outputs per second (TOPS), having a value of "0".

Lines L641 through L648 presents manual inputs provided by the client 105 and the administrator 101, with respect to the migration planning for the server/application image of the exemplary migration recommendation 600. Line L641 specifies if any data is to be encrypted on the system, having a value of "N". Line L642 specifies if the system is a High Performance Computing (HPC) server, having a value of "N". Line L643 specifies if the system has any non-standard devices attached, having a value of "Y". Line L644 specifies if this system is required to preside in traditional data centers, having a value of "N". Line 645 specifies if the system is allowed to migrate to a cloud, having a value of "Y". Line 646 specifies geographical areas in which the system can be hosted, having a value of "Americas". Line L647 specifies countries in which the system can be hosted, having a value of "US, Canada". Line L648 specifies a service category of the system, such as production, development, testing, having a null value.

Lines L651 through L654 presents how the test for selection rules R1 through R17 had been determined for the SL Pubic (L621), SL Private (L622), SL Bare Metal (L623), and CMS (L624) cloud types, respectively. Positions of "T" or "F" indicates status of corresponding rule number from R1 through R17, from R1 through R10 in the first rows and R11 through R17 in the second rows. Value "T" indicates that the answer to the question of the corresponding rule is true or yes, and value "F" indicates that the answer to the question in the corresponding rule is false or no. As noted, the rules R1 through R17 represent business logic to determine whether or not to migrate the subject server image of the exemplary migration recommendation 600. Respective responses to rules R1 through R17 may be a cause for the RAG STATUS in line L625 being not Green, and each responses to the rules R1 through R17 may be reviewed and/or further analyzed for any viable remedies. For selection rules R1 through R17 and meaning of the respective responses, detailed description is presented in FIG. 5 and corresponding description.

Certain embodiments of the present invention may offer various technical computing advantages, including the use of cognitive computing tools for automating cloud service brokerage and for automating data flow from interactive inputs, and the use of machine learning on categorical tests and corresponding results for server eligibility. Certain embodiments of the present invention offer automatically and comprehensively creating metadata for future migration recommendations, as accumulated from instances of all migrations along with the status such that further analysis on success or failure of migration may be performed and integrated to the metadata. Certain embodiments of the present invention utilize accurate, repeatable, and widely applicable to screening/selection criteria, based on comprehensive inputs, including but not limited to, a range of automatically discovered server characteristics of all platforms, infrastructure attributes involved in the migration, business and regulatory requirements affecting geographical locations involved in the migration, and other stakeholder inputs with respect to business strategy. Certain embodiments of the present invention provide detailed recommendation on whether or not respective servers in source platforms are eligible for migration to one or more target cloud, with respect to the type of the cloud, including both Infrastructure as a Service (IaaS) and Platform as a Service (PaaS), as well as a hybrid environment across two or more types of clouds. Further certain embodiments of the present invention facilitate a what-if analysis for certain contingency scenarios, before and during the migration in order to guide the migration through such contingencies. Accordingly, certain embodiments of the present invention may contribute to optimal business plans for risk managements, in which a certain changes that may affect the migration may be foreseen and prepared for or prevented. Certain embodiments of the present invention also provides guidance on remedial actions that are to be taken for a server image to qualify for the migration. Accordingly, migration engineers, and/or the client may take the suggested remedial action to have a target image that had been previously unqualified eligible for migration/cloud deployment, by taking such remedial actions.

Figure 7:
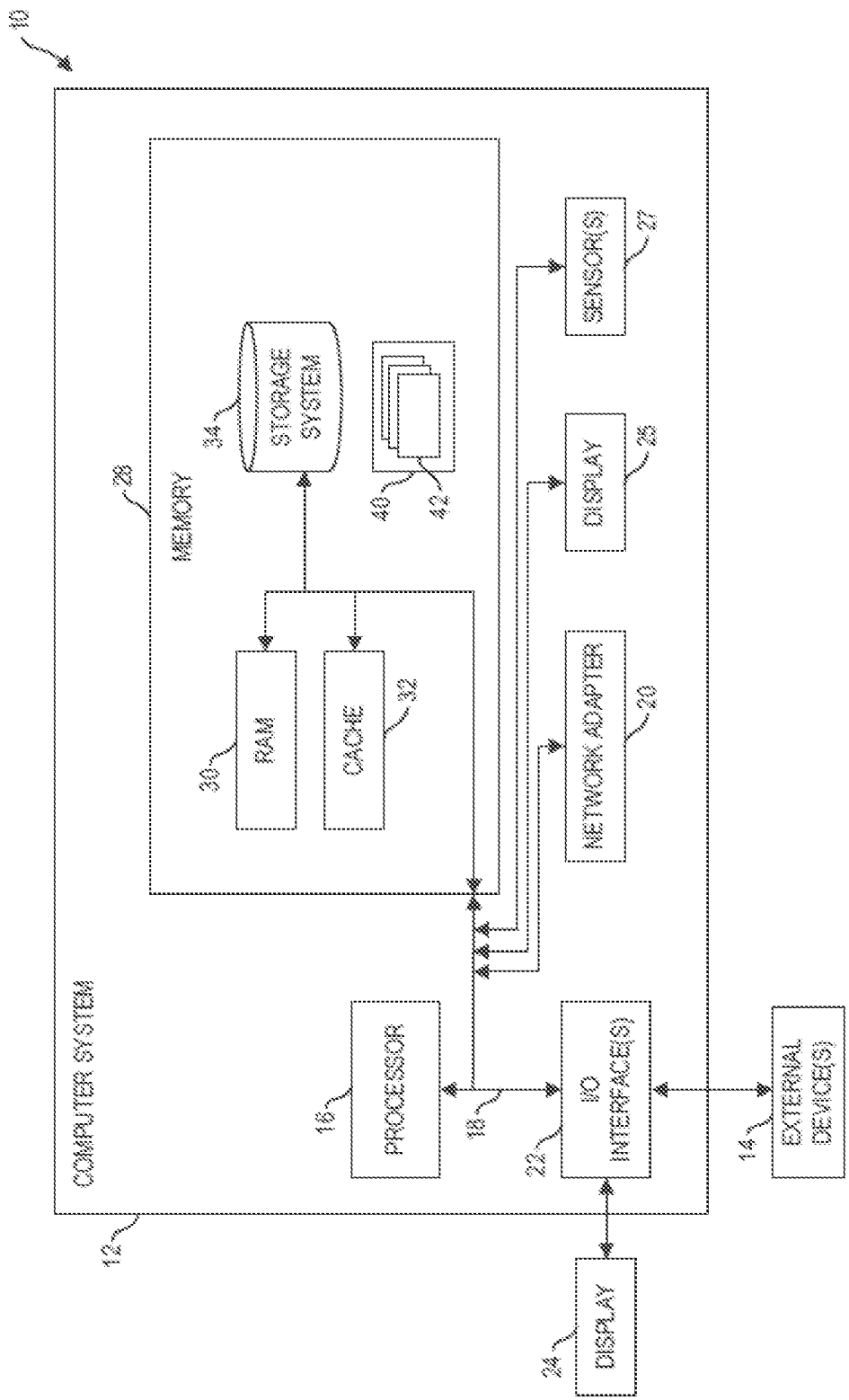
FIG. 7 depicts a cloud computing node according to an embodiment of the present invention.
Figure 8:
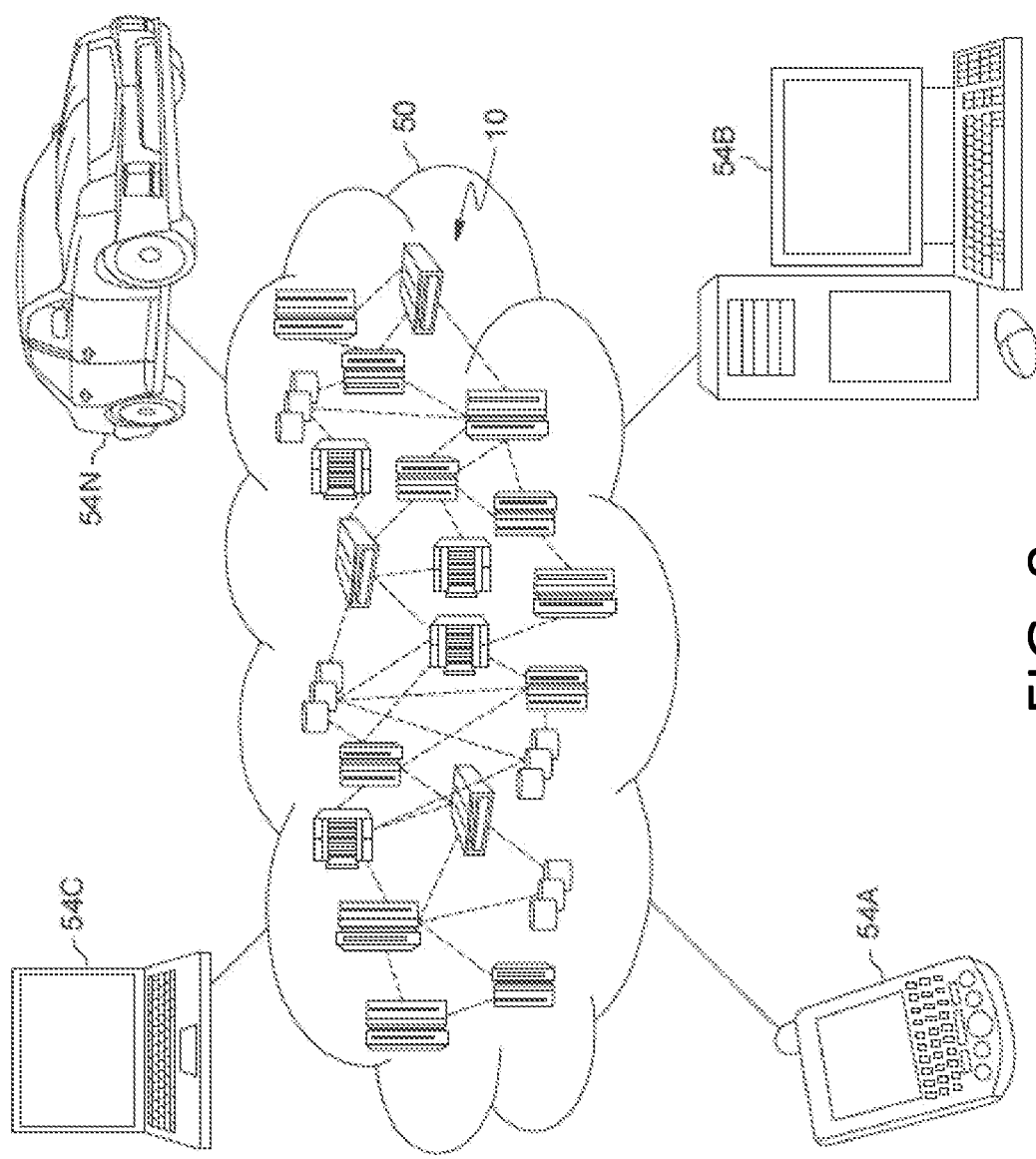
FIG. 8 depicts a cloud computing environment according to an embodiment of the present invention.
Figure 9:
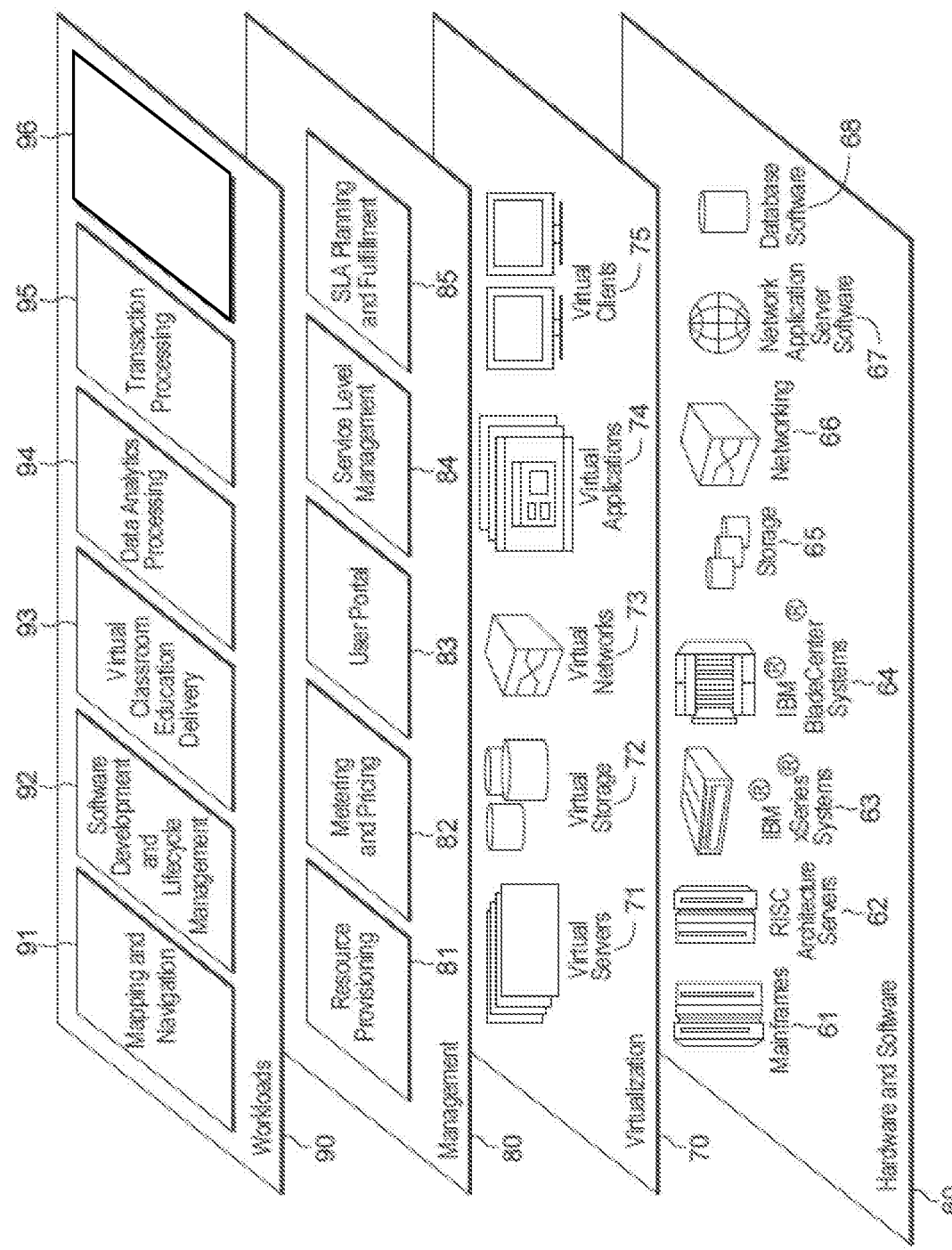
FIG. 9 depicts abstraction model layers according to an embodiment of the present invention.

FIGS. 7-9 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 7, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the cognitive cloud migration optimizer 120 and the Hybrid Cloud Target Analytics (HCTA) engine 130 of FIG. 1, respectively. Program processes 42, as in the HCTA engine 130 and the cognitive cloud migration optimizer 120, generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the optimization services in cases for cloud migration as provided by the cognitive cloud migration optimizer 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
    obtaining, by one or more processor, input data from a source environment, including application hosting data of each server in the source environment and one or more cloud type of the source environment;
    creating, by the one or more processor, a list of one or more candidate cloud type of a target platform, based on the input data;
    screening, by the one or more processor, servers in the source environment that are eligible for migration;
    selecting, by the one or more processor, the target platform by applying, for each candidate cloud type, preconfigured selection rules on the application hosting data of each eligible server in the source environment; and
    producing, by the one or more processor, migration recommendations for each eligible server in the source environment, including one or more cloud type corresponding to the target platform from the selecting.

2. The computer implemented method of claim 1, wherein the application hosting data comprises, respective to each application running in the source environment, a type and size of an application, one or more affinity group of the application, a tolerance for latency by the application, security and technical requirements on the application, workload characteristics data of the application, as affected by regulations applicable to the application and by client requests on the application.

3. The computer implemented method of claim 1, wherein the one or more cloud type of the source environment and the one or more candidate cloud type of the target platform are selected from: a public cloud, a private cloud, a hardware platform without virtualization, an enterprise application platform, and combination thereof, and wherein two or more cloud types are concurrently present in the source environment and the target platform.

4. The computer implemented method of claim 1, the screening comprising:
    identifying any server in the source environment that is excluded from the migration by applying the preconfigured selection rules on the application hosting data of each server in the source environment; and
    excluding the identified server from the migration.

5. The computer implemented method of claim 1, the screening comprising:
   identifying any server in the source environment that is disqualified for the migration by applying the preconfigured selection rules on the application hosting data of each server in the source environment; and
   flagging the identified server in order to analyze the application hosting data for one or more remedial action to remove any disqualifying aspect for the identified server.

6. The computer implemented method of claim 1, further comprising:
   collecting asset data, prior to the selecting, automatically from a plurality of data streams or interactively from a client or an administrator, the asset data including inventory data for the source environment, client request input data, workload characteristics data generated from a hypervisor of the source environment, cognitive updates on business, cognitive updates on technology, and cognitive updates on regulations; and
   consolidating the input data from the obtaining with the asset data from collecting for the selecting the target platform.

7. The computer implemented method of claim 1, wherein the preconfigured selection rules comprise rules of a server exclusion category and rules of a server qualification category, wherein the rules of the server exclusion category specify tests including: to exclude a current server from the migration if the current server is excluded from the migration by a plurality of factors affecting the migration including regulations, business policies, and technical requirements; to exclude applications from the migration if the applications had been deselected for the migration; to include the current server from the migration if cluster technology used in the current server is supported by the target platform; and to include the current server from the migration if a processor architecture of the current server is supported by the target platform, and wherein the rules of the server qualification category specify tests including: to qualify the current server for the migration if an operating system of the current server is supported by the target platform; to qualify the current server for the migration if software versions of the current server are supported by the target platform; to disqualify the current server for the migration if the current server is a high-performance computing system not supported in the target platform; to qualify the current server for the migration if a storage area network and a speed of data interface requirements for the current server are supported by the target platform; to disqualify the current server for the migration if the current server has a non-standard physical connectivity requirement; to qualify the current server for the migration if data residency and on-premises requirements of the current server are met by the target platform; to disqualify the current server for the migration if data at rest requires encryption; to qualify the current server for the migration if virtual CPU and virtual RAM requirements of the current server are supported by the target platform; and to qualify the current server for the migration if direct access or network attached storage device requirements are supported by the target platform.

8. A computer program product comprising:
   a computer readable storage medium readable by one or more processor and storing instructions for execution by the one or more processor for performing a method comprising:
      obtaining input data from a source environment, including application hosting data of each server in the source environment and one or more cloud type of the source environment;
      creating a list of one or more candidate cloud type of a target platform, based on the input data;
      screening servers in the source environment that are eligible for migration;
      selecting the target platform by applying, for each candidate cloud type, preconfigured selection rules on the application hosting data of each eligible server in the source environment; and
      producing migration recommendations for each eligible server in the source environment, including one or more cloud type corresponding to the target platform from the selecting.

9. The computer program product of claim 8, wherein the application hosting data comprises a type and size of an application, one or more affinity group of the application, a tolerance for latency, and various factors affecting the migration with respect to regulations by geographical and/or national boundaries, business policy and client request, as well as technological trend and recent developments.

10. The computer program product of claim 8, wherein the one or more cloud type of the source environment and the one or more candidate cloud type of the target platform are selected from: a public cloud, a private cloud, a hardware platform without virtualization, an enterprise application platform, and combination thereof, and wherein two or more cloud types are concurrently present in the source environment and the target platform.

11. The computer program product of claim 8, the screening comprising:
   identifying any server in the source environment that is excluded from the migration by applying the preconfigured selection rules on the application hosting data of each server in the source environment; and
   excluding the identified server from the migration.

12. The computer program product of claim 8, the screening comprising:
   identifying any server in the source environment that is disqualified for the migration by applying the preconfigured selection rules on the application hosting data of each server in the source environment; and
   flagging the identified server in order to analyze the application hosting data for one or more remedial action to remove any disqualifying aspect for the identified server.

13. The computer program product of claim 8, further comprising:
   collecting asset data, prior to the selecting, automatically from various data streams or interactively from a client or an administrator, including inventory data for the source environment, client request input data, workload characteristics data generated from a hypervisor of the source environment, and cognitive updates on business, technology, and regulations; and
   consolidating the obtained input data with the collected asset data for the selecting.

14. The computer program product of claim 8, wherein the selection rules of a server exclusion category comprise questions to determine: if a current server is excluded from the migration; if applications had been deselected for the migration; if cluster technology is supported by the target platform; and if a processor architecture of the current server is supported by the target platform, and wherein the selection rules of a server qualification category comprise questions to determine: if an operating system of the current server is supported by the target platform; if software versions of the current server are supported by the target platform; if the current server is a high-performance computing system; if a storage area network and a speed of data interface requirements for the current server are supported by the target platform; if the current server has a non-standard physical connectivity requirement; if a data residency and on-premises requirements of the current server are met by the target platform; if data at rest requires encryption; if virtual CPU and virtual RAM requirements are supported by the target platform; and if direct access or network attached storage device requirements are supported by the target platform.

15. A system comprising:
a memory;
one or more processor in communication with the memory; and
program instructions executable by the one or more processor via the memory to perform a method comprising:
obtaining input data from a source environment, including application hosting data of each server in the source environment and one or more cloud type of the source environment;
creating a list of one or more candidate cloud type of a target platform, based on the input data;
screening servers in the source environment that are eligible for migration;
selecting the target platform by applying, for each candidate cloud type, preconfigured selection rules on the application hosting data of each eligible server in the source environment; and
producing migration recommendations for each eligible server in the source environment, including one or more cloud type corresponding to the target platform from the selecting.

16. The system of claim 15, the screening comprising:
identifying any server in the source environment that is excluded from the migration by applying the preconfigured selection rules on the application hosting data of each server in the source environment; and
excluding the identified server from the migration.

17. The system of claim 15, the screening comprising:
identifying any server in the source environment that is disqualified for the migration by applying the preconfigured selection rules on the application hosting data of each server in the source environment; and
flagging the identified server in order to analyze the application hosting data for one or more remedial action to remove any disqualifying aspect for the identified server.

18. The system of claim 15, further comprising:
monitoring, subsequent to the producing, the source environment for any changes in workload that had not been included in the application hosting data for the migration recommendations from the producing;
updating the migration recommendations with a change in a landing zone of the target platform corresponding to the changes from the monitoring, to thereby accommodate new workloads that had not been included in the migration recommendations.

19. The system of claim 15, further comprising:
analyzing, subsequent to the producing, prospective changes that affect a migration plan presented in the migration recommendations, wherein the prospective changes are detected from a data stream regarding cognitive updates on business, technology, and regulations; and
updating records in consolidated asset data according to the prospective changes to thereby the migration recommendations cover contingencies base on the prospective changes, wherein the consolidated asset data includes the input data from the obtaining and asset data including inventory data for the source environment, client request input data, workload characteristics data generated from a hypervisor of the source environment, cognitive updates on business, cognitive updates on technology, and cognitive updates on regulations, that had been automatically collected from a plurality of data streams corresponding to respective data types.

20. The system of claim 15, further comprising:
performing, subsequent to the screening, a remedial action that removes one or more aspect from a server in the source environment that had disqualified for the migration from the screening based on the preconfigured selection rules, wherein the one or more aspect that disqualified the server for the migration includes, that an operating system of the server is not supported by the target platform, that software versions of the server are not supported by the target platform, that the server is a high-performance computing system which is not supported in the target platform, that a storage area network and a speed of data interface requirements for the server are not supported in the target platform, that the server has any non-standard physical connectivity requirement, that requirements on data residency and on-premises condition of the server are not met by the target platform, that the server is required to encrypt data at rest, that requirements on virtual CPU and virtual RAM by the server are not supported by the target platform, and that requirements on direct access or network attached storage device of the server are not supported by the target platform.

* * * * *